(12) United States Patent
Machita et al.

(10) Patent No.: US 7,876,535 B2
(45) Date of Patent: Jan. 25, 2011

(54) MAGNETORESISTIVE DEVICE OF THE CPP TYPE, AND MAGNETIC DISK SYSTEM

(75) Inventors: Takahiko Machita, Tokyo (JP); Koji Shimazawa, Tokyo (JP); Daisuke Miyauchi, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 551 days.

(21) Appl. No.: 12/019,205

(22) Filed: Jan. 24, 2008

(65) Prior Publication Data

US 2009/0190268 A1 Jul. 30, 2009

(51) Int. Cl.
*G11B 5/39* (2006.01)

(52) U.S. Cl. .................................... 360/319

(58) Field of Classification Search ............... 360/319, 360/324.12, 324.2, 327.1, 327.3, 327.33
See application file for complete search history.

(56) References Cited

U.S. PATENT DOCUMENTS

| | | | |
|---|---|---|---|
| 6,807,033 B2* | 10/2004 | Zhu | 360/324 |
| 7,035,062 B1* | 4/2006 | Mao et al. | 360/324.2 |
| 7,382,588 B2* | 6/2008 | Gill | 360/324.11 |
| 2007/0274011 A1 | 11/2007 | Ohta et al. | |
| 2008/0186640 A1* | 8/2008 | Matsubara et al. | 360/324.12 |

FOREIGN PATENT DOCUMENTS

| | | |
|---|---|---|
| JP | 2002-123912 | 4/2002 |
| JP | 2002-175611 | 6/2002 |
| JP | 2004-319709 | 11/2004 |
| JP | 2007-317269 | 12/2007 |

OTHER PUBLICATIONS

U.S. Appl. No. 12/255,105, filed Oct. 21, 2008, Chou, et al.
U.S. Appl. No. 11/946,358, Nov. 28, 2007, Shimazawa, et al.
U.S. Appl. No. 12/014,575, filed Jan. 15, 2008, Chou, et al.
U.S. Appl. No. 12/019,202, filed Jan. 24, 2008, Machita, et al.
U.S. Appl. No. 12/022,538, filed Jan. 30, 2008, Chou, et al.
U.S. Appl. No. 12/028,243, filed Feb. 8, 2008, Shimazawa, et al.

* cited by examiner

*Primary Examiner*—Angel A. Castro
(74) *Attorney, Agent, or Firm*—Oblon, Spivak, McClelland, Maier & Neustadt, L.L.P.

(57) ABSTRACT

A magnetoresistive device of a CPP (current perpendicular to plane) structure includes a magnetoresistive unit sandwiched between a first substantially soft magnetic shield layer from below, and a second substantially soft magnetic shield layer from above, with a sense current applied in a stacking direction. The magnetoresistive unit includes a non-magnetic intermediate layer sandwiched between a first ferromagnetic layer, and a second ferromagnetic layer. At least one of the first and second shield layers is configured in a window frame of a planar shape, including a front frame-constituting portion and a back frame-constituting portion partially comprising a combination of a nonmagnetic gap layer with a bias magnetic field-applying layer. The combination of the nonmagnetic gap layer with the bias magnetic field-applying layer forms a closed magnetic path with magnetic flux going all the way around the window framework, turning the magnetization of the front frame-constituting portion into a single domain.

13 Claims, 7 Drawing Sheets

MAGNETORESISTIVE DEVICE OF THE CPP TYPE, AND MAGNETIC DISK SYSTEM

BACKGROUND OF THE INVENTION

1. Field of the Invention

The present invention relates to a magnetoresistive device adapted to read the magnetic field intensity of magnetic recording media or the like as signals, and a thin-film magnetic head comprising that magnetoresistive device as well as a head gimbal assembly and a magnetic disk system, one each including that thin-film magnetic head.

2. Explanation of the Prior Art

A thin-film magnetic head is built up of a reproducing head having a reading magnetoresistive device (MR device) and a recording head having a writing induction type electromagnetic device.

A typical construction of part of the MR device includes a multilayer structure made up of an anti-ferromagnetic layer/first ferromagnetic layer/non-magnetic intermediate layer/second ferromagnetic layer.

The first ferromagnetic layer is also called a fixed magnetization layer because its direction of magnetization remains fixed by the antiferromagnetic layer adjacent to it. By contrast, the second ferromagnetic layer is referred to as a free layer because its direction of magnetization changes by way of sensitive reaction with an external magnetic field change.

A lower electrode and shield layer and an upper electrode and shield layer (hereinafter often called the shield layers for short) are provided such that the aforesaid multilayer MR device is sandwiched between them from above and below, so that leaking magnetic fluxes from adjacent recorded data can be cut off.

The shield layers located above and below the multilayer MR device are each made of a soft magnetic thin film, and one each is generally formed in such a way as to have a closure domain structure with an easy axis of magnetization in the same direction as the track width direction of the MR device. Here, if the domain structures of the shield layers are not stably formed with variations per head, then there are also variations in the bias state applied to the MR device (especially a bias applied to the free layer), which may otherwise give rise to a problem of offering an obstacle to improvements in production yields.

In association with an increasing magnetic recording density, it is increasingly required for the MR device to be much narrower than ever before in terms of track width and read gap. As the read gap grows narrower, it causes the distance between the shield layers and the free layer forming the MR device portion to decrease drastically, letting the shield layers have strong influences on the bias state of the MR device portion. Specifically, if there is a change in the domain structures of the shield layers due to an external magnetic field, it could bring about an output fluctuation of the MR device. That is, the resistance to an external magnetic field (magnetic field resistance) could get worse.

To make the domain structure of the shield layers stable, JP(A)8-212521 discloses a technique of providing a domain control layer for the stabilization of the domains for the shields. Specifically, the publication sets forth a method wherein an antiferromagnetic film or hard magnetic film is formed for the magnetic shields thereby achieving a single domain structure having one single direction of magnetization.

Similar effects are also achieved by the method of JP(A)8-169023 showing that the magnetic shield is made up of a multilayer film structure comprising a multilayer structure of a soft magnetic film and a nonmagnetic film.

However, these methods are now found to have a problem with practical use, because they involve very intractable production processes. More exactly, the former has much difficulty in achieving a single domain for a shield layer of about 1 μm in thickness, using the exchange coupling of an antiferromagnetic film or hard magnetic film. The latter would be not very practicable, too, because of needing a lot more stacks for achieving a single domain.

JP(A)2007-242140 discloses a technique for configuring the planar shape of a shield portion in a reproducing head into an annular one to control the domain structure of the shield portion thereby reducing output fluctuations of the reproducing head under the influences of the shield and, hence, obtaining stabilized outputs.

As far as what is set forth in the aforesaid publication is concerned, control of the domain structure of the shield portion would be still less than satisfactory. Thus, there is a mounting demand for the development of a novel technique for holding back output fluctuations of the reproducing head under the influences of shields and, hence, obtaining stabilized outputs.

The situation being like such, the invention has been made for the purpose of providing a novel device structure capable of turning a shield layer of the order of a few thousands Å to a few μm into a single domain in a simplified yet stable manner and achieving a more stable domain structure so that output fluctuations of a reproducing head under the influences of shield layers can be kept more in check to allow the reproducing head to produce stabilized outputs.

SUMMARY OF THE INVENTION

According to the present invention, the aforesaid object is accomplished by the provision of a magnetoresistive device of the CPP (current perpendicular to plane) structure, comprising a magnetoresistive unit, and a first, substantially soft magnetic shield layer positioned below and a second, substantially soft magnetic shield layer positioned above, which are located and formed such that the magnetoresistive unit is sandwiched between them from above and below, with a sense current applied in the stacking direction, wherein: said magnetoresistive unit comprises a nonmagnetic intermediate layer, and a first ferromagnetic layer and a second ferromagnetic layer stacked and formed such that said nonmagnetic intermediate layer is sandwiched between them; at least one of said first shield layer positioned below and said second shield layer positioned above is configured in a window frame shape having a planar shape (X-Y plane) defined by the width and length directions of the device; said window framework has a front frame-constituting portion located on a medium opposite plane side in front and near where the magnetoresistive unit is positioned, and a back frame-constituting portion located in the rear of said front frame-constituting portion; the depth length of said back front-constituting portion is larger than the depth length of said front frame-constituting portion; said back frame-constituting portion partially comprises a combination of a nonmagnetic gap layer with a bias magnetic field-applying layer; said nonmagnetic gap layer is designed and located such that a magnetic flux given out of said bias magnetic field-applying layer is efficiently sent out to said front frame-constituting portion; and the combination of said nonmagnetic gap layer with said bias magnetic field-applying layer forms a closed magnetic path with a magnetic flux going all the way around said window framework, and turns the magnetization of said front frame-constituting portion into a single domain.

In a preferable embodiment of the magnetoresistive device according to the invention, $\phi b/\phi f(s)$ is set to the range of 0.3 to 2.0 where $\phi b$ is the total quantity of a magnetic flux flowing out of said bias magnetic field-applying layer and $\phi f(s)$ is the saturation quantity of a magnetic flux for the saturation of magnetization of the front frame-constituting portion where said magnetoresistive unit is positioned.

In a preferable embodiment of the magnetoresistive device according to the invention, the depth length of said back frame-constituting portion is 1.4 to 10 times as large as the depth length of said front frame-constituting portion.

In a preferable embodiment of the magnetoresistive device according to the invention, said nonmagnetic gap layer is buried in said back frame-constituting portion, and the bias magnetic field-applying layer is formed adjacent to said nonmagnetic gap layer.

In a preferable embodiment of the magnetoresistive device according to the invention, said second shield layer that is positioned above is configured in a window framework having a planar shape (X-Y plane) defined by the width and length directions of the device; said window framework comprises a front frame-constituting portion located on a medium opposite plane side in front and near where the magnetoresistive unit is positioned, and a back frame-constituting portion located in the rear of that front frame-constituting portion; the depth length $Y_1$ of said back frame-constituting portion is larger than the depth length $Y_2$ of said front frame-constituting portion ($Y_1 > Y_2$); said back frame-constituting portion partially comprises a combination of a nonmagnetic gap layer with a bias magnetic field-applying layer; said nonmagnetic gap layer is designed and located such that a magnetic flux given out of said bias magnetic field-applying layer is efficiently sent out to said front frame-constituting portion; the combination of said nonmagnetic gap layer with said bias magnetic field-applying layer forms a closed magnetic path with a magnetic flux going all the way around said window frame shape forming said first shield layer, and turns the magnetization of said front frame-constituting portion into a single domain; said first shield layer that is positioned below is configured in a window framework having a planar shape (X-Y plane) defined by the width and length directions of the device; said window framework comprises a front frame-constituting portion located on a medium opposite plane side in front and near where the magnetoresistive unit is positioned, and a back frame-constituting portion located in the rear of that front frame-constituting portion; the depth length $Y_{11}$ of said back frame-constituting portion is larger than the depth length $Y_{22}$ of said front frame-constituting portion ($Y_{11} > Y_{22}$); said back frame-constituting portion partially comprises a combination of a nonmagnetic gap layer with a bias magnetic field-applying layer; said nonmagnetic gap layer is designed and located such that a magnetic flux given out of said bias magnetic field-applying layer is efficiently sent out to said front frame-constituting portion; the combination of said nonmagnetic gap layer with said bias magnetic field-applying layer forms a closed magnetic path with a magnetic flux going all the way around said window frame shape forming said first shield layer, and turns the magnetization of said front frame-constituting portion into a single domain.

According a preferable embodiment of the magnetoresistive device of the invention, in said second shield layer, the depth length $Y_1$ of said back frame-constituting portion is 1.4 to 10 times as large as the depth length $Y_2$ of said front frame-constituting portion, and in said first shield layer, the depth length $Y_{11}$ of said back frame-constituting portion is 1.4 to 10 times as large as the depth length $Y_{22}$ of said front frame-constituting portion.

According to a preferable embodiment of the magnetoresistive device of the invention, in said first and second shield layers, said nonmagnetic gap layers are each buried in said back frame-constituting portion, and the bias magnetic field-applying layer is formed adjacent to said nonmagnetic gap layer.

In a preferable embodiment of the magnetoresistive device according to the invention, each of said first and second shield layers has a thickness of 0.5 to 2.0 μm, and the bias magnetic field-applying layer has a thickness of 0.1 to 0.3 μm.

In a preferable embodiment of the magneto-resist effect device according to the invention, both ends of said magnetoresistive unit in the width direction X-direction) are provided with a device bias-applying layer for applying a bias magnetic field to the first and second ferromagnetic layers functioning as free layers.

In a preferable embodiment of the magnetoresistive device according to the invention, said bias magnetic field-applying layers and device bias-applying layer are magnetized integrally and simultaneously in the width direction (X-direction).

The invention also provides a thin-film magnetic head, comprising a plane in opposition to a recording medium, and the aforesaid magnetoresistive device, which is located near said medium opposite plane to detect a signal magnetic field from said recording medium.

Further, the invention provides a head gimbal assembly, comprising a slider including the aforesaid thin-film magnetic head and located in such a way as to oppose to a recording medium, and a suspension adapted to resiliently support said slider.

Yet further, the invention provides a magnetic disk system, comprising a slider including the aforesaid thin-film magnetic head and located in such a way as to oppose to a recording medium, and a positioning device adapted to support and position said slider with respect to said recording medium.

EXPLANATION OF THE PREFERRED EMBODIMENTS

Figure 1:
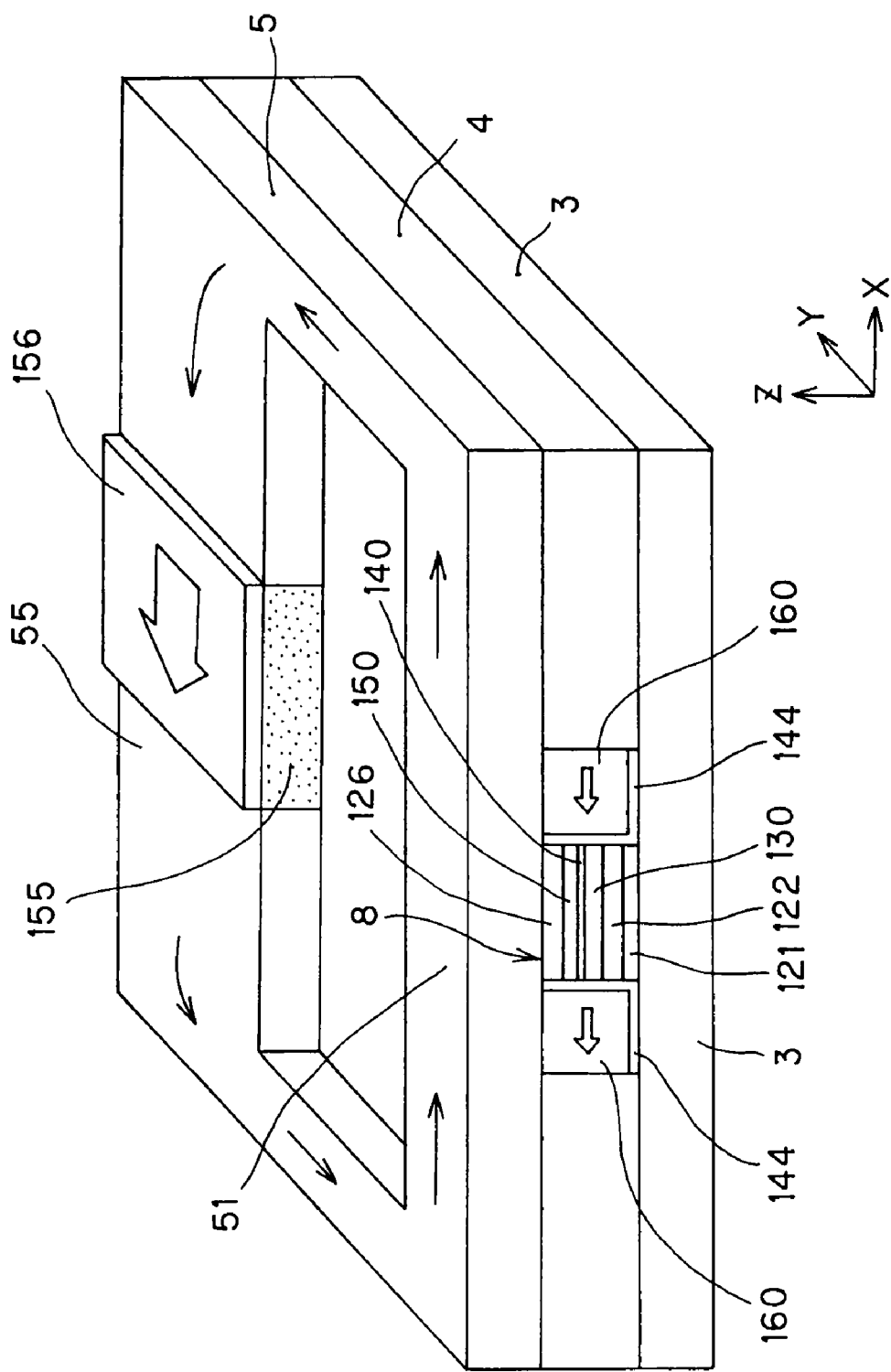
FIG. 1 is illustrative in perspective of the magnetoresistive device according to an embodiment of the invention, as viewed from the ABS (air bearing surface).

The best mode for carrying out the invention is now explained in greater details.

The magnetoresistive device of the invention is preferably used with a thin-film magnetic head in general and a reproducing head in particular.

In the following disclosure of the invention, the sizes of each device component in the X-, Y- and Z-axis directions shown in the drawings will be referred to as the "width", "length" and "thickness", respectively. The side of the device nearer to the air bearing surface (the plane of the thin-film magnetic head in opposition to the recording medium) in the Y-axis direction will be called "forward" and the opposite side (depth side) will be called "rearward", and the direction of stacking the individual films up will be called "upward" or "upper side" and the opposite direction will be called "downward" or "lower side".

FIG. 1 is illustrative in perspective of the magnetoresistive device according to an embodiment of the invention, as viewed from the ABS (air bearing surface). The ABS is generally corresponding to a plane (hereinafter often called the medium opposite plane) at which the device lies in opposition to the recording medium; however, it is understood that the ABS here includes even a section at a position where the multilayer structure of the device can be clearly observed. For instance, a protective layer of DLC (the protective layer adapted to cover the device) or the like, in a strict sense, positioned facing the medium opposite plane may be factored out, if necessary.

Figure 2:
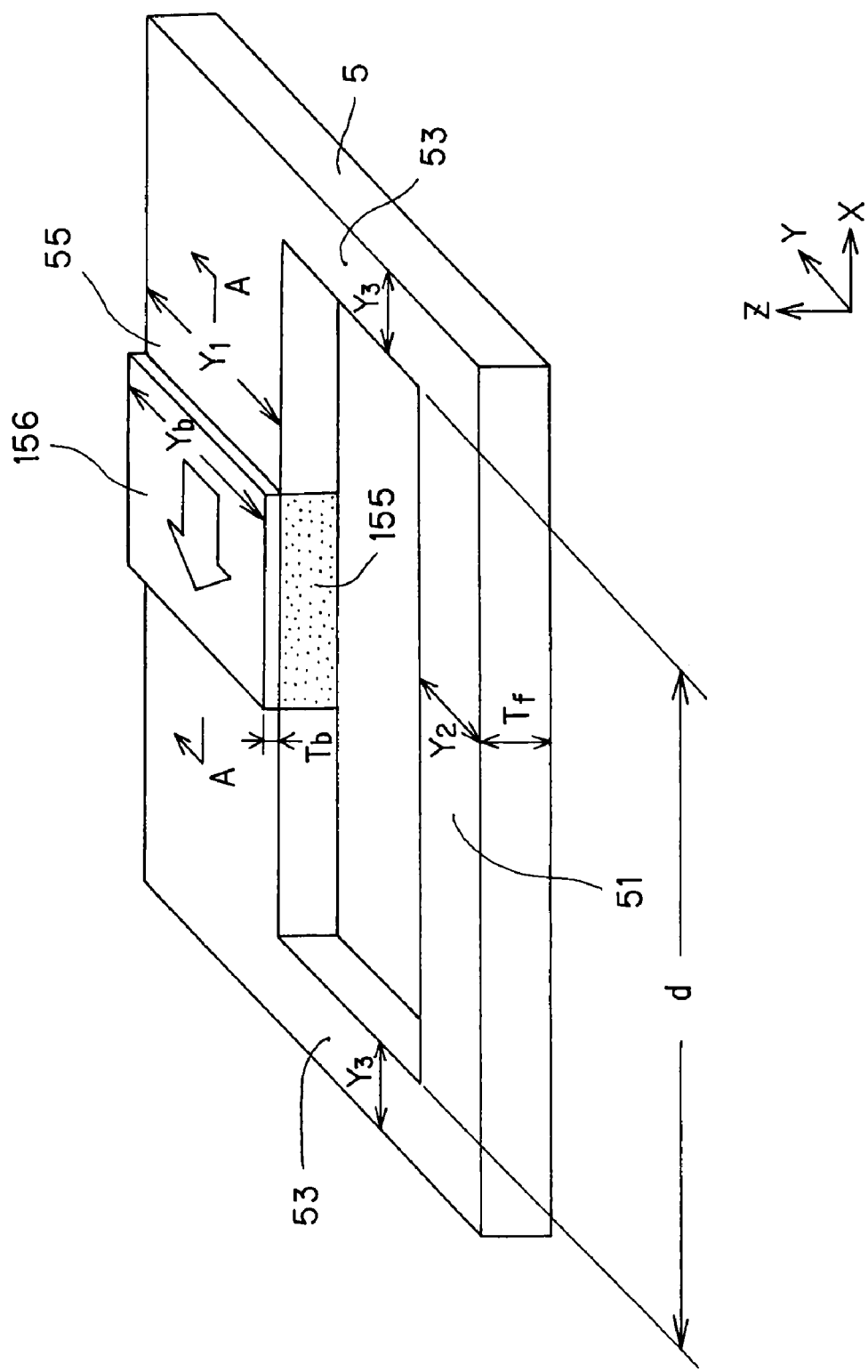
FIG. 2 is a perspective view of the second shield layer removed out of the magnetoresistive device of FIG. 1, wherein said second shield layer forming a part of that device is a substantially soft magnetic member positioned above.

FIG. 2 is a perspective view of the second shield layer removed out of the magnetoresistive device of FIG. 1, wherein said second shield layer forming a part of that device is a substantially soft magnetic member positioned above.

Figure 3:
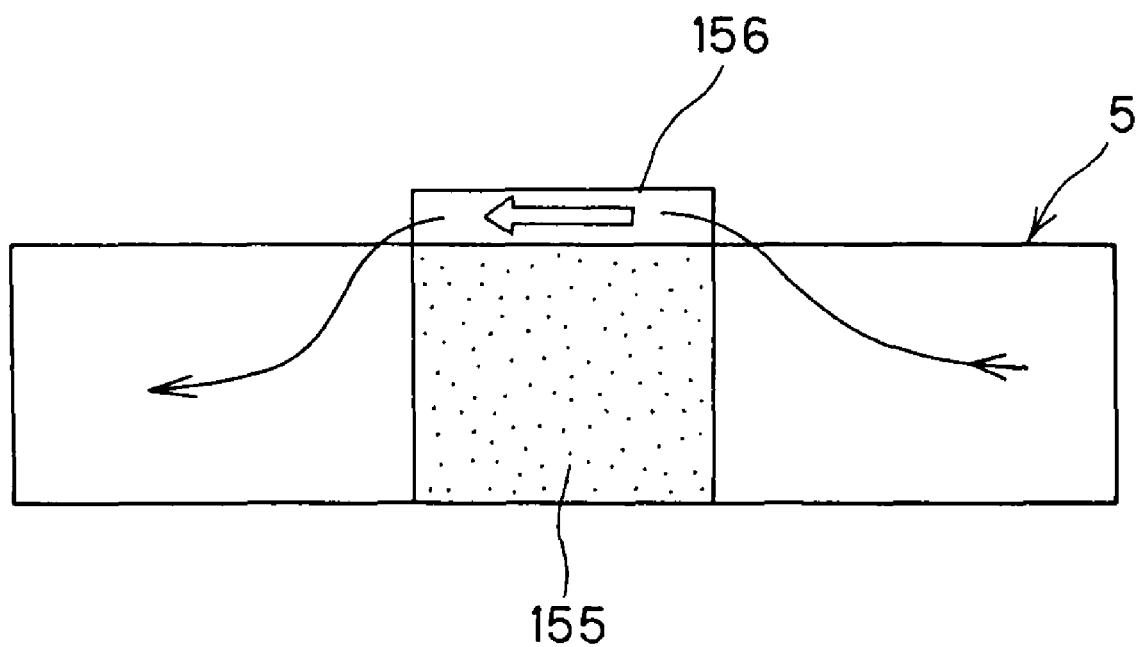
FIG. 3 is a sectional view as taken on an arrowed A-A section in FIG. 2.

FIG. 3 is a sectional view of FIG. 2 as taken on an arrowed A-A section.

[Explanation of the Structure of the Magnetoresistive Device]

As shown in FIG. 1, the magnetoresistive device of the invention comprises a magnetoresistive unit 8, and a first, substantially soft magnetic shield layer 3 (also called the lower shield layer 3) that is positioned below and a second, substantially soft magnetic shield layer 5 (also called the upper shield layer 5) that is located above wherein those shield layers are located and formed such that the magnetoresistive unit 8 is sandwiched between them from above and below.

And the magnetoresistive device of the invention is a magnetoresistive device of the CPP (current perpendicular to plane) structure with a sense current applied in the stacking direction (Z-direction) of the magnetoresistive unit 8.

The magnetoresistive unit 8 comprises a nonmagnetic intermediate layer 140, and a first 130 and a second ferromagnetic layer 150 stacked and formed such that the nonmagnetic intermediate layer 140 is sandwiched between them.

In the invention, the second shield layer 5 positioned above is formed in the form of a window framework having a planar shape (X-Y plane) defined by the width and length directions of the device, as shown in FIG. 1. In the embodiment shown, the first shield layer 3 that is positioned below, too, is formed in the form of a window framework, as is the case with the second shield layer 5. And the first and second shield layers 3 and 5 in FIG. 1 have their magnetization directions controlled by the respective bias magnetic field-applying layers built in them.

The second shield layer 5 positioned above and the first shield layer 3 positioned below are each preferably in the form of a window framework; however, either one of them may be in an ordinary rectangular form rather than in the window frame shape, for instance, a rectangular form having a planar shape (X-Y plane) size of about 30 μm×15 μm.

The respective components of the invention are now explained in greater details.

(Explanation of the First 3, and the Second Shield Layer 5)

In the embodiment of the invention here, the first shield layer 3 (also called the lower shield layer 3), and the second shield layer 5 (also called the upper shield layer 5) has:

(1) a function of shielding off magnetism from an external magnetic field, and (2) an electrode function.

The aforesaid function (2) may be dispensed with, because of being also achievable by the adoption of a separately added, new electrode layer. A noteworthy point here is that to enhance the function of shielding off magnetism from an external magnetic field and make magnetic field resistance better, an unheard-of special arrangement and structure is used, as explained below in detail.

In the example of the invention, one embodiment having the same structure and arrangement is shown for the first 3, and the second shield layer 5. Reference is now made typically to the second shield layer 5.

In the invention, the second shield layer 5 positioned above is in a window frame shape having a planar shape (X-Y plane) defined by the width and length directions of the device. To put it another way, a window of substantially quadrangular shape is punched out of a rectangular sheet at its center. Only the second shield layer 5 positioned above is shown in perspective in FIG. 2.

The window framework for the second shield layer 5 comprises a front frame-constituting portion 51 that is located on the medium opposite plane (ABS) side in front and near where the magnetoresistive unit 8 is positioned, and a back frame-constituting portion 55 that is located in the rear of and almost parallel with that front frame-constituting portion 51.

The depth length $Y_1$ of the back frame-constituting portion 55 is larger than the depth length $Y_2$ of the front frame-constituting portion 51 ($Y_1 > Y_2$). More preferably, the depth length $Y_1$ of the back frame-constituting portion is set in such a way as to be 1.4 to 10 times as large as the depth length $Y_2$ of the aforesaid front frame-constituting portion.

The width $Y_3$ of a side frame-constituting portion 53 making a bridge between the back frame-constituting portion 55 and the front frame-constituting portion 51 is larger than the depth length $Y_2$ of the front frame-constituting portion 51 ($Y_3/Y_2$). More preferably, the width $Y_3$ of the side frame-constituting portion 53 is set in such a way as to be 1.2 to 2 times as large as the depth length $Y_2$ of the aforesaid front frame-constituting portion 51.

Why such requirements are in need originates from (1) the relationship between the thickness of a bias magnetic field-applying layer 156 formed on the shield and the thickness of the front frame-constituting portion 51 formed for the second shield layer 5, and results eventually from (2) the relationship between the total quantity φb of a magnetic flux flowing out of the bias magnetic field-applying layer 156 and the saturation quantity φf(s) of a magnetic flux for the saturation of the magnetization of the front frame-constituting portion 51 where the magnetoresistive unit 8 is positioned, as will be described later.

As shown in FIGS. 1, 2 and 3, the back frame-constituting portion 55 positioned at the rear of the second shield layer 5 partially comprises a combination of a second nonmagnetic gap layer 155 with the bias magnetic field-applying layer 156. Other than the combination of the nonmagnetic gap layer 155 with the bias magnetic field-applying layer 156, the second shield layer 5 is made of a high-permeable, soft magnetic material; this is the reason there is the "second, substantially soft magnetic shield layer 5" involved in the invention of this application.

Figure 4:
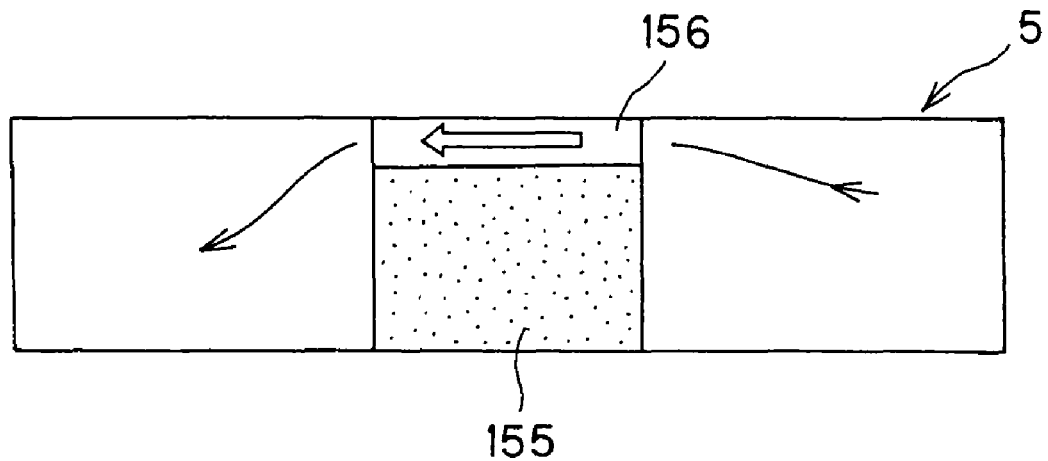
FIG. 4 is illustrative of a modification to FIG. 3.
Figure 5:
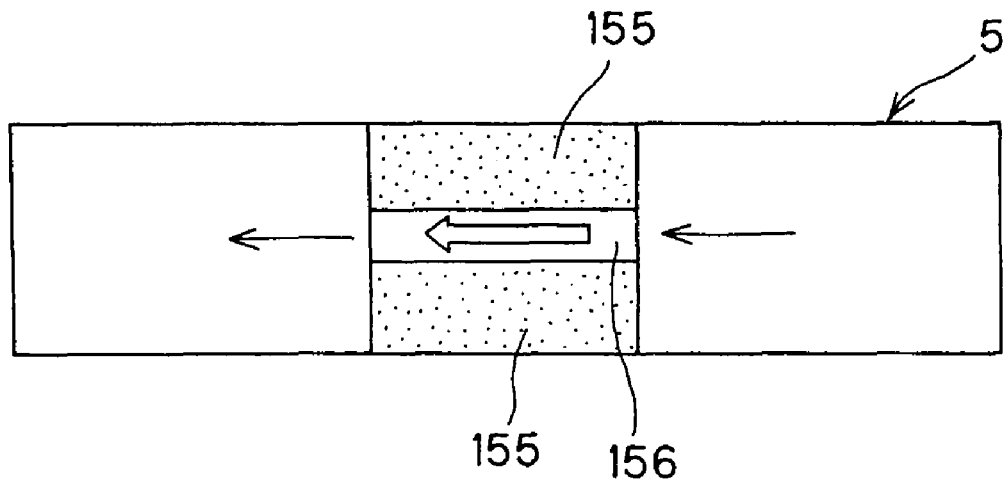
FIG. 5 is illustrative of another modification to FIG. 3.

As shown in FIGS. 2 and 3, the nonmagnetic gap layer 155 is buried in the back frame-constituting portion 55, and the bias magnetic field-applying layer 156 is formed adjacent to that nonmagnetic gap layer 155. In the embodiment shown, the bias magnetic field-applying layer 156 is formed on the nonmagnetic gap layer 155. In the embodiment illustrated, the soft magnetic member of the second shield layer 5 is partly broken by the nonmagnetic gap layer 155; however, the soft magnetic member of the second shield layer 5 may just as well be partly broken by a multilayer structure of the nonmagnetic gap layer 155 and bias magnetic field-applying layer 156, as shown in FIGS. 4 and 5.

In the invention, the action of the nonmagnetic gap layer 155 is of vital importance; it is of much importance to design and locate it such that the magnetic flux given out of the bias magnetic field-applying layer 156 is efficiently sent out to the side of the front frame-constituting portion 51.

If, in FIG. 3, the nonmagnetic gap layer 155 is removed and instead the soft magnetic member of the second shield layer 5 is used there, then there would be inconvenience that much of the magnetic flux given out of the bias magnetic field-applying layer 156 returns back through the soft magnetic member used there. In other words, it would be impossible to efficiently send the magnetic flux given out of the bias magnetic field-applying layer 156 out to the side of the aforesaid front frame-constituting portion 51.

From such a point of view, the combination of the nonmagnetic gap layer 155 with the bias magnetic field-applying layer 156 here is designed and set up such that there is a closed magnetic path formed with a magnetic flux going all the way around the window frame shape forming the second shield layer 5, and the magnetization of the front frame-constituting portion 51 where the magnetoresistive unit 8 is positioned is turned into a single domain. The X-direction length Gp of the nonmagnetic gap layer 155 is preferably greater than the thickness Tf of the shield film, and the X-direction length of the bias magnetic field-applying layer 156 is preferably roughly at least 5 times as large as the thickness Tb of the bias magnetic field-applying layer 156. Upper limits to both the X-direction length Gp of the nonmagnetic gap layer 155 and the X-direction length of the bias magnetic field-applying layer 156, respectively, are defined by shield shape, and preferably smaller than the width d of the centrally punched out, almost quadrangular shape (FIG. 2).

Especially in the invention, to turn into a single domain the magnetization of the front frame-constituting portion 51 where the magnetoresistive unit 8 is positioned, it is desired that the value of $\phi b/\phi f(s)$ be in the range of 0.3 to 2.0, preferably 0.8 to 2.0, where $\phi b$ is the total quantity of the magnetic flux flowing out of the bias magnetic field-applying layer 156 and $\phi f(s)$ is the saturation quantity of the magnetic flux for the saturation of the magnetization of the front frame-constituting portion 51 where the magnetoresistive unit 8 is positioned.

The total quantity $\phi b$ of the magnetic flux flowing out of the bias magnetic field-applying layer 156 is represented in terms of the product of the residual magnetic flux density Brb of the material forming the bias magnetic field-applying layer 156 and the sectional area Sb of the magnetic flux flowing out of the bias magnetic field-applying layer 156: $\phi b=Brb \times Sb$. Note here that the sectional area Sb is an X-Z plane represented by thickness Tb×depth length Yb ($=Y_1$) shown in FIG. 2 (Sb=Tb×Yb).

The saturation quantity $\phi f(s)$ of the magnetic flux for the saturation of the magnetization of the front frame-constituting portion 51 where the magnetoresistive unit 8 is positioned is represented in terms of the product of the saturation magnetic flux density Bsf of the material forming the front frame-constituting portion 51 and the sectional area Sf of the front frame-constituting portion 51: $\phi f(s)=Bsf \times Sf$. Note here that the sectional area Sf is a Y-Z plane represented by thickness Tf×depth length $Y_2$ shown in FIG. 2 (Sf=Tf×$Y_2$).

The thickness Tf of the front frame-constituting portion 51 that is the same as the thickness of the second shield layer 5 should be 0.5 to 2.0 μm. This is the thickness necessary for letting the shield layer have the so-called magnetic shield function, and that shield layer is formed by the so-called plating.

On the other hand, the bias magnetic field-applying layer 156 should have a thickness Tb of 0.1 to 0.3 μm. The film of that bias magnetic field-applying layer 156 is formed by sputtering; exceeding that upper limit would incur some considerable economical losses, and falling short of that lower limit would render it less likely for the bias magnetic field-applying layer to have its own function.

Given a difference between such film thicknesses Tf and Tb, it is required to meet the aforesaid desirous numerical requirements such that the magnetic flux flowing out of the bias magnetic field-applying layer 156 can get to the front frame-constituting portion 51 where the magnetoresistive unit 8 is positioned, and the magnetic flux necessary for turning the magnetization of the front frame-constituting portion 51 into a single domain is obtainable.

It is noted that one exemplary size for the front frame-constituting portion 51 is $Y_2$=5 μm, Tf=1 μm, and X-direction width=30 μm.

For the bias magnetic field-applying layer 156, for instance, a hard magnetic layer (hard magnet), or a multilayer structure of a ferromagnetic layer and an anti-ferromagnetic layer is used. Specifically, CoPt or CoCrPt is mentioned for the former, and a multilayer structure of CoFe and IrMr is mentioned for the latter.

For the nonmagnetic gap layer 155, there is the mention of oxides such as alumina and silica; nitrides such as alumina nitride and silicon nitride; and non-magnetic metals such as Cr, Ta, NiCr, Au and Cu.

Between the nonmagnetic gap layer 155 and the bias magnetic field-applying layer 156, it is desired to interpose an underlay layer and a buffer layer. It follows that, in a preferable embodiment of the invention, the underlay layer and buffer layer are formed on the non-magnetic gap layer 155 in order, and the bias magnetic field-applying layer 156 is formed on the buffer layer.

The underlay layer is provided mainly for the purpose of making the surface of the nonmagnetic gap layer 155 flat, and Ti, Ta or the like is used for it. The thickness should be about 1 to 5 nm.

The buffer layer is used with a view to improving on the crystallizablity and orientation of the bias magnetic field-applying layer 156. When the bias magnetic field-applying layer 156 is formed of a hard magnetic layer (hard magnet), Cr, CrTi or the like is used as the buffer layer material with a thickness of about 2 to 10 nm. When the bias magnetic field-applying layer 156 is formed of a multilayer structure of a ferromagnetic layer and an anti-ferromagnetic layer, Ru, NiCr or the like is used as the buffer layer material with a thickness of about 2 to 10 nm.

Both the underlay layer and the buffer layer are preferably used; however, only one may be used or none of them may be used.

For the substantially soft magnetic material for the second shield layer 5, there is the mention of NiFe (permalloy), CoZrTa, sendust, NiFeCo, CoZrNb, and so on.

It is desired that the first shield layer 3, too, is configured as is the case with the aforesaid second shield layer 5. This is to make sure output fluctuations of the reproducing head under the influences of the shields are kept more in check to obtain more stabilized outputs.

That is, the first shield layer 3 that is positioned below is configured in a window framework having a planar shape (X-Y plane) defined by the width and length directions of the device, and the aforesaid window framework comprises a front frame-constituting portion located on the medium opposite plane side in front and near where the magnetoresistive unit 8 is positioned, and a back frame-constituting portion located in the rear of the front frame-constituting portion. The depth length $Y_{11}$ (corresponding to $Y_1$ in FIG. 2) of the back frame-constituting portion is larger than the depth length $Y_{22}$ (corresponding to $Y_2$ in FIG. 2) of the aforesaid front frame-constituting portion ($Y_{11} > Y_{22}$). The aforesaid back frame-constituting portion partially comprises a combination of a nonmagnetic gap layer with a bias magnetic field-applying layer. The aforesaid nonmagnetic gap layer is designed and located such that it works to efficiently send a magnetic flux given out of the aforesaid bias magnetic field-applying layer out to the side of the aforesaid front frame-constituting portion, and the combination of the aforesaid nonmagnetic gap layer with the aforesaid bias magnetic field-applying layer is set up in such a way as to form a closed magnetic path with a magnetic flux going all the way around the framework forming the first shield layer, and turn into a single domain the magnetization of the aforesaid front frame-constituting portion.

In the first shield layer 3, therefore, $\phi'b/\phi'f(s)$ is set to the range of 0.3 to 2.0, preferably 0.8 to 2.0 where $\phi'b$ is the total quantity of the magnetic flux flowing out the bias magnetic field-applying layer and $\phi'f(s)$ is the saturation quantity of the magnetic flux for the saturation of the magnetization of the front frame-constituting portion.

Also in the first shield layer 3, the depth length $Y_{11}$ (corresponding to $Y_1$ in FIG. 2) of the back frame-constituting portion is set up in such a way as to be 1.4 to 10 times as large as the depth length $Y_{22}$ (corresponding to $Y_2$ in FIG. 2) of the aforesaid front frame-constituting portion.

In the first shield layer 3, too, an arrangement comprising such a nonmagnetic gap layer and bias magnetic field-applying layer combination as mentioned in conjunction with the second shield layer 5 may just as well be used.

(Explanation of the Magnetoresistive Unit 8)

As shown in FIG. 1, the magnetoresistive device in the embodiment here comprises a first 3 and a second shield layer 5 that are mutually opposed above and below in the drawing at a given interval, a magnetoresistive unit 8 of the CPP structure interposed between the first 3 and the second shield layer 5, an insulating film 144 adapted to cover two sides of the magnetoresistive unit 8 and a part of the upper surface of the first shield layer 3 along two such sides, and two device bias magnetic field-applying layer 160 adjacent to both sides of the magnetoresistive unit 8 by way of the insulating film 144.

For the magnetoresistive unit 8, for instance, use may be made of a CPP-GMR device unit harnessing the giant magnetoresistive, and TMR device unit tapping the tunnel type magnetoresistive. As shown in FIG. 1, the magnetoresistive unit 8 comprises, and is built up of, a nonmagnetic intermediate layer 140, and a first 130 and a second ferromagnetic layer 150 stacked and formed with the nonmagnetic intermediate layer 140 held between them.

In FIG. 1, for instance, the first ferromagnetic layer 130 functions as a fixed magnetization layer 130 having a fixed direction of magnetization, and the second ferromagnetic layer 150 functions as a free layer 150 working such that its direction of magnetization changes depending on an externally applied signal magnetic field.

More specifically, the magnetoresistive unit 8 exemplified in FIG. 1 is set up in the form of a multilayer film wherein an antiferromagnetic layer 122 as a pinning layer formed on the first shield layer 3 by way of an underlay layer 121, a fixed magnetization layer 130 formed on that antiferromagnetic layer 122, a nonmagnetic intermediate layer 140 formed on that fixed magnetization layer 130, a free layer 150 formed on that nonmagnetic intermediate layer 140 and a cap layer 126 (protective layer 126) formed on that free layer 150 are stacked up in order.

This multilayer film are held by the front frame-constituting portions on the ABS side of the first 3 and the second shield layer 5, and with a voltage applied between the first 3 and the second shield layer 5, there is a sense current flowing in the thickness direction of the multilayer film.

Each of the layers forming the magnetoresistive unit 8 is now explained at great length.

(Explanation of the Fixed Magnetization Layer 130)

In the invention, the fixed magnetization layer 130 is formed on the antiferromagnetic layer 122 having a pinning action via the underlay layer 21 formed on the first shield layer 3.

The fixed magnetization layer 30 may be configured in either one single film form or multilayer film form.

Referring typically to the multilayer film form that is a preferable form, the fixed magnetization layer 130 has a so-called synthetic pinned layer comprises, in order from the side of the antiferromagnetic layer 122, an outer layer, a nonmagnetic layer and an inner layer, all stacked together in order. The outer and the inner layer are each provided by a ferromagnetic layer made of, for instance, a ferromagnetic material containing Co, and Fe. The outer and the inner layer are antiferromagnetically coupled and fixed such that their magnetization directions are opposite to each other.

The outer, and the inner layer is preferably formed of, for instance, a $CO_{70}Fe_{30}$ (at %) alloy layer. The outer layer has a thickness of preferably about 3 to 7 nm, and the inner layer has a thickness of preferably about 3 to 10 nm. The nonmagnetic layer, for instance, is made of a nonmagnetic material containing at least one selected from the group consisting of Ru, Rh, Ir, Re, Cr, Zr and Cu, and has a thickness of, for instance, about 0.35 to 1.0 nm.

(Explanation of the Free Layer 150 and Cap Layer 126)

The free layer 150 has its magnetization direction changing depending on an external magnetic field, i.e., a signal magnetic field from the recording medium, and is formed of a ferromagnetic layer (soft magnetic layer) having a small coercive force. The free layer 150 has a thickness of, for instance, about 2 to 10 nm, and may be in either a single layer form or a multilayer form including a plurality of ferromagnetic layers.

As shown in FIG. 1, there is the cap (protective) layer 126 formed on such free layer 150. The cap layer 126, for instance, is formed of a Ta or Ru layer, and has a thickness of about 0.5 to 20 nm.

(Explanation of the Nonmagnetic Intermediate Layer 140)

The device here is preferably represented by the so-called CPP-GMR device and TMR device. For this reason, the nonmagnetic intermediate layer 140, for instance, is made of one material selected from the group consisting of $Al_2O_x$, MgO, Cu, Au, Ag, ZnO, $TiO_x$, $SiO_2$, $HfO_x$, and $ZrO_x$, and has a thickness of about 1.0 to 3.0 nm.

(Explanation of the Antiferromagnetic Layer 122)

The antiferromagnetic layer 122 functioning as the pinning layer works such that by way of exchange coupling with the fixed magnetization layer 130 as described above, the magnetization direction of the fixed magnetization layer 130 is fixed.

For instance, the antiferromagnetic layer 122 is made of an antiferromagnetic material containing at least one element M' selected from the group of Pt, Ru, Rh, Pd, Ni, Cu, Ir, Cr and Fe, and Mn. The content of Mn is preferably 35 to 95 at %. The antiferromagnetic material is broken down into two types: (1) a non-heat treatment type antiferromagnetic material that shows anti-ferromagnetism even in the absence of heat treatment to induce an exchange coupling magnetic field between it and a ferromagnetic material, and (2) a heat treatment type antiferromagnetic material that is going to show anti-ferromagnetism by heat treatment. In the invention, both types (1) and (2) may be used without restriction. For instance, the non-heat treatment type antiferromagnetic material is exemplified by RuRhMn, FeMn, and IrMn, and the heat treatment type antiferromagnetic material is exemplified by PtMn, NiMn, and PtRhMn.

The antiferromagnetic layer 122 has a thickness of about 4 to 30 nm.

It is here noted that for the layer for fixing the magnetization direction of the fixed magnetization layer 130, it is acceptable to use a hard magnetic layer comprising a hard magnetic material such as CoPt in place of the aforesaid antiferromagnetic layer.

The underlay layer 121 formed below the anti-ferromagnetic layer 122 is provided to improve on the crystallizability and orientation of each of the layers stacked on it in general, and the exchange coupling of the antiferromagnetic layer 122 and the fixed magnetization layer 130 in particular. For such underlay layer 121, for instance, a multilayer of Ta and NiCr layers is used. The underlay layer 121 has a thickness of about 2 to 6 nm as an example.

Further, the insulating layer 144 shown in FIG. 1 is made of, for instance, alumina. For the device bias magnetic field-applying layers 160, for instance, a hard magnetic layer (hard magnet) or a multilayer structure of a ferromagnetic layer and an antiferromagnetic layer may be used, and there is the specific mention of CoPt or CoCrPt.

It is here noted that, as shown in FIG. 1, the direction that the device bias magnetic field-applying layer 160 is magnetized and the direction that the bias magnetic field-applying layer 156 formed on the back frame-constituting portion for the shield layer is magnetized is in alignment with the same width direction (X-direction). For this reason, such bias layers 160 and 156 can be magnetized integrally and simultaneously, going much in favor of simplified production processes.

[Explanation of the Whole Structure of the Thin-film Magnetic Head]

Figure 6:
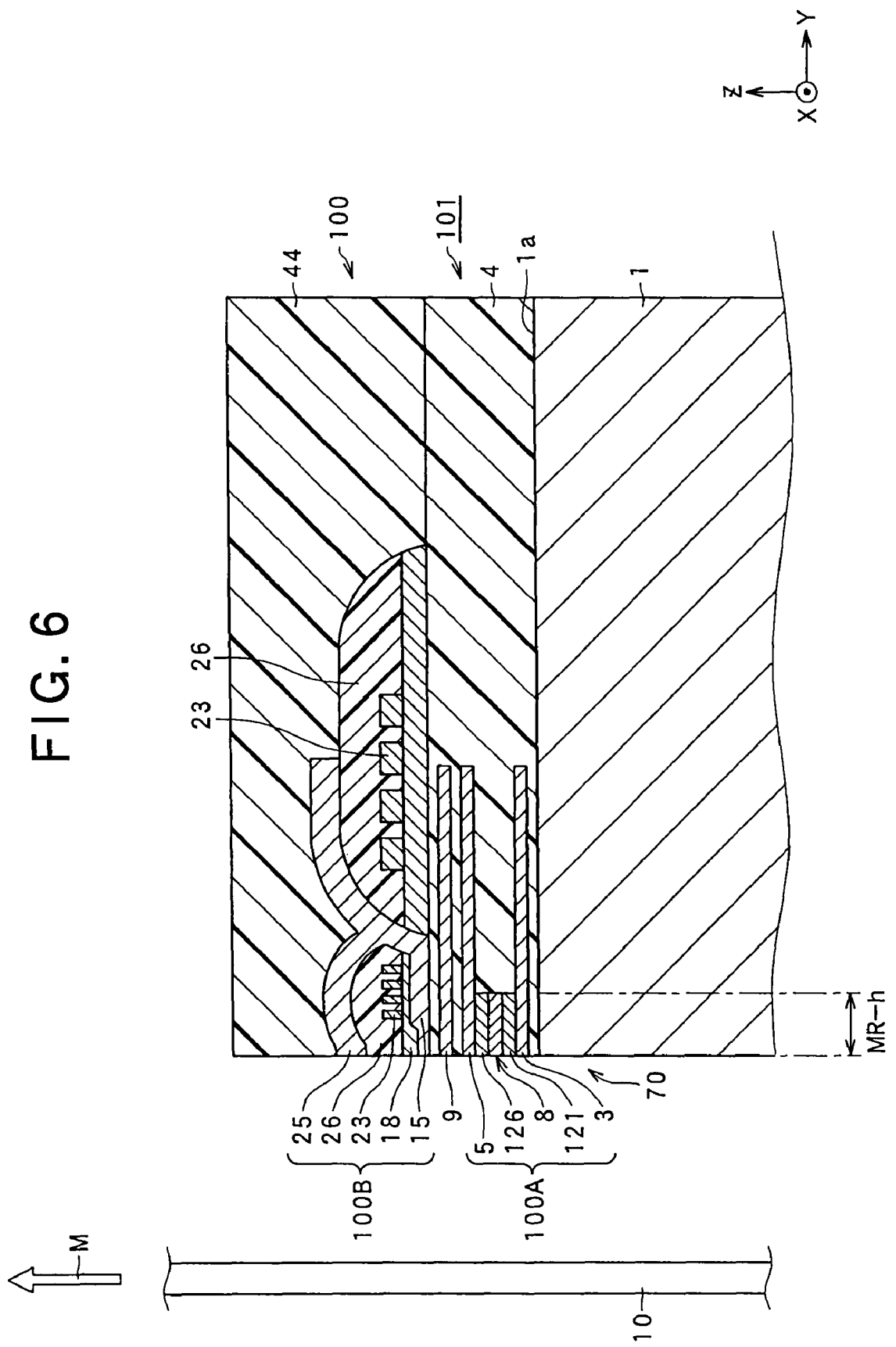
FIG. 6 is illustrative in section of the thin-film magnetic head parallel with the so-called air bearing surface (ABS).

FIG. 6 is illustrative in section (section in the Y-Z plane) of a thin-film magnetic head parallel with the so-called air bearing surface (ABS).

A thin-film magnetic head 100 shown in FIG. 6 is used on a magnetic recording system such as a hard disk drive for the purpose of applying magnetic processing to a recording medium 10 like a hard disk moving in a medium travel direction M.

The thin-film magnetic head 100 illustrated in the drawing is a composite type head capable of implementing both recording and reproducing as magnetic processing. The structure comprises, as shown in FIG. 6, a slider substrate 1 made of a ceramic material such as AlTiC ($Al_2O_3$ TiC), and a magnetic head unit 101 formed on the slider substrate 1.

The magnetic head unit 101 has a multilayer structure comprising a reproducing head portion 100A adapted to implement reproducing process for magnetic information recorded by making use of the magneto-resistive (MR) effect and a shield type recording head portion 100B adapted to implement, for instance, a perpendicular recording type recording processing.

A detailed account is now given below.

A first shield layer 3 and a second shield layer 5 are each a planar layer formed in such a way as to be almost parallel with the side 1a of the slider substrate 1, forming a part of the ABS that is a medium opposite plane 70.

A magnetoresistive unit 8 is disposed in such a way as to be held between the first 3 and the second shield layer 5, forming a part of the medium opposite plane 70. And a height in the perpendicular direction (Y-direction) to the medium opposite plane 70 defines an MR height (MR-h).

For instance, the first 3 and the second shield layer 5 are each formed by pattern plating inclusive of frame plating or the like. Although not clearly illustrated in the drawing, it is understood that the first 3 and the second shield layer 5 must be set up in such a way as to produce the aforesaid advantages of the invention.

The magnetoresistive unit 8 is a multilayer film formed in such a way as to be almost parallel with the side 1a of the slider substrate 1, forming a part of the medium opposite plane 70.

The magnetoresistive unit 8 is a multilayer film of the current-perpendicular-to-plane type (CPP type) with a sense current passing in the direction perpendicular to the staking plane, and for such a multilayer film use is preferably made of a TMR (tunnel magneto-resistive) film or a CPP type GMR (giant magneto-resistance) film. Use of such a magnetoresistive device as the magnetoresistive unit 8 enables a signal magnetic field from a magnetic disk to be sensed with very high sensitivity.

When the TMR device is used as the magnetoresistive unit 8, it comprises a structure wherein an anti-ferromagnetic layer, a fixed magnetization layer, a tunnel barrier layer and a free magnetization layer (free layer) are stacked up in order. For the antiferromagnetic layer, use is made of a film made of IrMn, PtMn, NiMn, RuRhMn or the like and having a thickness of about 5 to 15 nm. The fixed magnetization layer is exemplified by a so-called synthetic pinned layer construction wherein, for instance, CoFe that is a ferromagnetic material or a nonmagnetic metal layer such as a Ru one is sandwiched between two layers of CoFe or the like. For the tunnel barrier layer, use is made of a film obtained by oxidizing a metal film made of Al, AlCu, Mg or the like and having a thickness of about 0.5 to 1 nm. That film may have been obtained as by oxidization using oxygen introduced in vacuum equipment or natural oxidization. The free magnetization layer (free layer) is made up of a two-layer film composed of CoFe or the like that is a ferromagnetic material and has a thickness of about 1 nm and NiFe or the like having a thickness of about 3 to 4 nm. The free magnetization layer (free layer) makes a tunnel junction to the fixed magnetization layer by way of the tunnel barrier layer. When the so-called CPP type GMR film is used as the magnetoresistive unit 8, the tunnel barrier layer in the aforesaid TMR film may be replaced by a nonmagnetic, electroconductive film made of Cu or the like and having a thickness of about 1 to 3 nm.

As shown in FIG. 6, between the first shield layer 3 and the magnetoresistive unit 8, and between the magnetoresistive unit 8 and the second shield layer 5, there are a lower metal gap layer (underlay layer) 121 and an upper metal gap layer (cap layer) 126 provided, respectively. One each 121, 126 is made up of a nonmagnetic material such as Ru or Ta.

As shown in FIG. 6, between the second shield layer 5 and the recording head portion 100B there is an inter-device shield layer 9 formed that is made of a similar material to that of the second shield layer 5.

The inter-device shield layer 9 keeps the magnetoresistive unit 8 functioning as a sensor out of a magnetic field occurring from the recording head 100B, taking a role in prevention of extraneous noises upon reading. Between the inter-device shield layer 9 and the recording head portion 100B there may also be a backing coil portion formed. The backing coil portion is to generate a magnetic flux that cancels out a magnetic flux loop that is generated from the recording head portion 100B, passing through the upper and lower electrode layers of the magnetoresistive unit 8: this backing coil portion works to hold back the wide adjacent track erasure (WATE) phenomenon that is unwanted writing or erasure operation with the magnetic disk.

At a gap between the first and second shield layers 3 and 5 on the side of the magnetoresistive unit 8 that faces away from the medium opposite plane 70, at the rear of the first and second shield layers 3, 5 and the inter-device shield layer 9 that face away from the medium opposite plane 70, at a gap between the first shield layer 3 and the slider substrate 1, and at a gap between the inter-device shield layer 9 and the recording head portion 100B, there are insulating layers 4 and 44 formed, one each made of alumina or the like.

The recording head portion 100B is preferably constructed for the purpose of perpendicular magnetic recording, and comprises a main magnetic pole layer 15, a gap layer 18, a coil insulating layer 26, a coil layer 23 and an auxiliary magnetic pole layer 25, as shown in FIG. 6.

The main magnetic pole layer 15 is set up as a magnetic guide path for guiding a magnetic flux induced by the coil layer 23 to the recording layer of a magnetic recording medium 10 with information being to be written on it while converging that magnetic flux. At the end of the main magnetic pole layer 15 here that is on the medium opposite plane 70 side, the width in the track width direction (along the X-axis of FIG. 6) and thickness in the stacking direction (along the Z-axis of FIG. 6) of the main magnetic pole layer should preferably be less than those of the rest. Consequently, it is possible to generate a fine yet strong writing magnetic flux well fit for high recording densities.

The end on the medium opposite plane 70 side of the auxiliary magnetic pole layer 25 magnetically coupled to the main magnetic pole layer 15 forms a trailing shield portion having a layer section wider than that of the rest of the auxiliary magnetic pole layer 25. As shown in FIG. 6, the auxiliary magnetic pole layer 25 is opposed to the end of the main magnetic pole layer 15 on the medium opposite plane 70 side while the gap layer 18 made of an insulating material such as alumina and the coil insulating layer 26 are interposed between them.

By the provision of such auxiliary magnetic pole layer 25, it is possible to make steeper a magnetic field gradient between the auxiliary magnetic pole layer 25 and the main magnetic pole layer 15 near the medium opposite plane 70. Consequently, jitters of signal outputs diminish, resulting in the ability to minimize error rates upon reading.

The auxiliary magnetic pole layer 25, for instance, is formed at a thickness of, e.g., about 0.5 to 5 µm using frame plating, sputtering or the like. The material used may be an alloy comprising two or three of, for instance, Ni, Fe and Co, or comprising them as a main component with the addition of given elements to it.

The gap layer 18 is formed in such a way as to space the coil layer 23 away from the main magnetic pole layer 15. The gap layer 18 is constructed from $Al_2O_3$, DLC (diamond-like carbon) or the like having a thickness of, for instance, about 0.01 to 0.5 µm, and formed using, for instance, sputtering, CVD or the like.

[Explanation of the Head Gimbal Assembly and the Hard Disk System]

Each one example of the head gimbal assembly and the hard disk system, used with the foregoing thin-film head mounted on it, is now explained.

A slider 210 included in the head gimbal assembly is first explained with reference to FIG. 7. In the hard disk system, the slider 210 is located in such a way as to face a hard disk that is a rotationally driven disk-form recording medium. This slider 210 primarily comprises a substrate 211 built up of a substrate and an overcoat.

The substrate 211 is in a generally hexahedral shape. Of the six surfaces of the substrate 211, one surface is in opposition to the hard disk. On that one surface there is the air bearing plane 70 formed.

Figure 7:
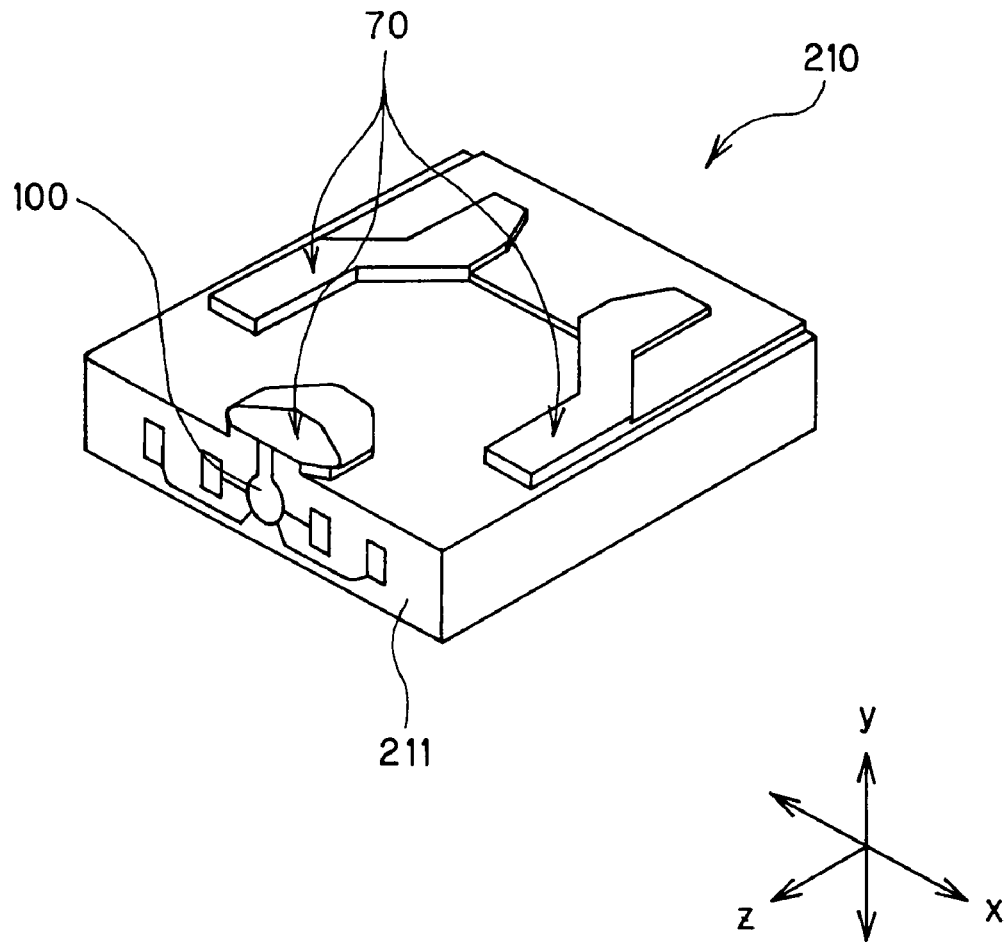
FIG. 7 is illustrative in perspective of the slider included in the head gimbal assembly according to one embodiment of the invention.

As the hard disk rotates in the z-direction in FIG. 7, it causes an air flow passing between the hard disk and the slider 210 to induce lift relative to the slider 210 in the downward y-direction in FIG. 7. This lift in turn causes the slider 210 to levitate over the surface of the hard disk. Note here that the x direction in FIG. 7 traverses tracks on the hard disk.

Near the end of the slider 210 on an air exit side (the left lower end in FIG. 7), there is a thin-film magnetic head formed according to the embodiment here.

A head gimbal assembly 220 according to this embodiment is now explained with reference to FIG. 8. The head gimbal assembly 220 comprises a slider 210 and a suspension 221 adapted to resiliently support that slider 210. The suspension 221 comprises a leaf spring-form load beam 222 made of typically stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction x of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

Figure 8:
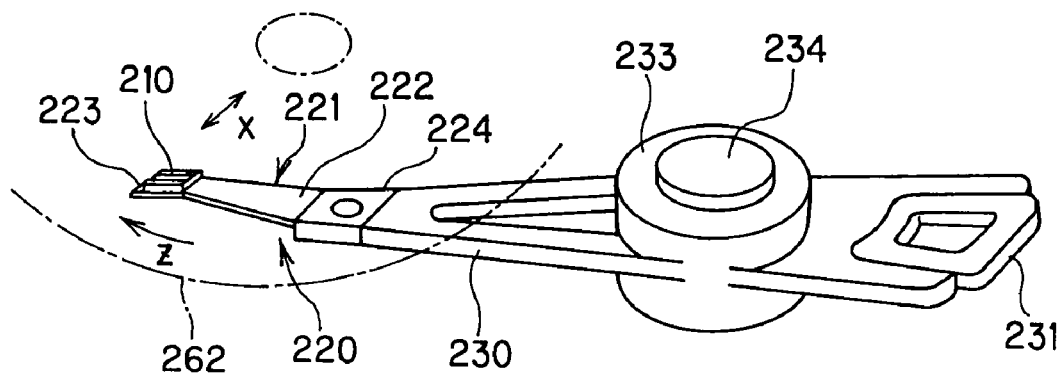
FIG. 8 is illustrative in perspective of the head arm assembly comprising the head gimbal assembly according to one embodiment of the invention.

FIG. 8 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is a bearing portion 233 attached to a shaft 234 adapted to support the arm 230 in a pivotal fashion.

Each one example of the head stack assembly and the hard disk system according to the embodiment here are now explained with reference to FIGS. 9 and 10.

Figure 9:
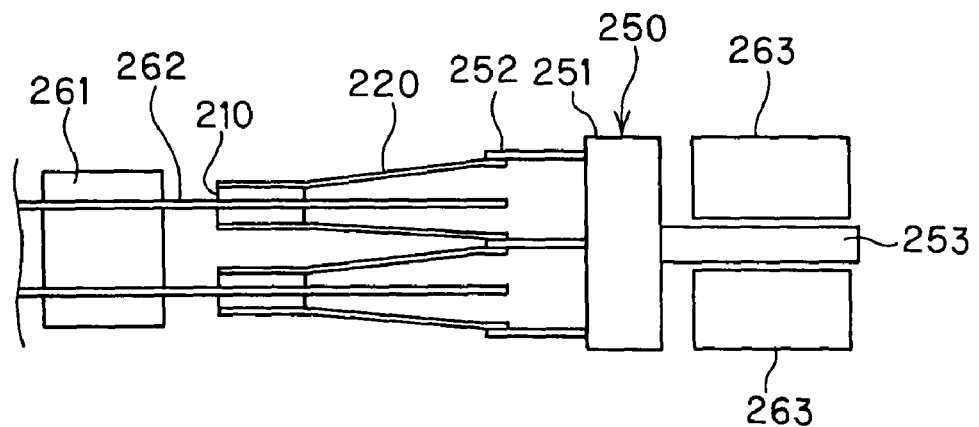
FIG. 9 is illustrative of part of the hard disk system according to one embodiment of the invention.
Figure 10:
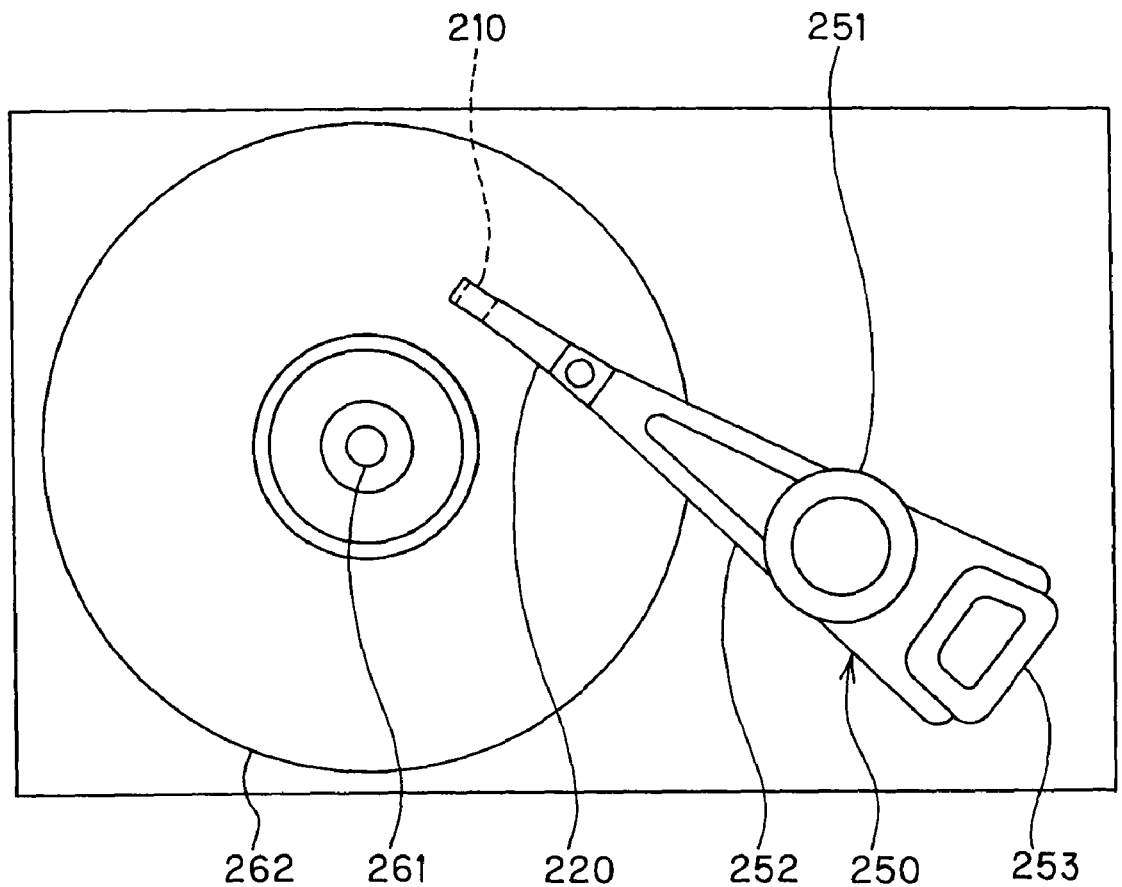
FIG. 10 is a plan view of the hard disk system according to one embodiment of the invention.

FIG. 9 is illustrative of part of the hard disk system, and FIG. 10 is a plan view of the hard disk system.

A head stack assembly 250 comprises a carriage 251 having a plurality of arms 252. The plurality of arms 252 are provided with a plurality of the head gimbal assemblies 220 such that they line up perpendicularly at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device here which is operable to support the slider 210 and position it relative to the hard disk 262.

With the hard disk system here, the actuator is actuated to move the slider 210 in the track traverse direction of the hard disk 262, thereby positioning the slider 210 with respect to the hard disk 262. The thin-film magnetic head incorporated in the slider 210 works such that information is recorded by a recording head in the hard disk 262, and the information recorded in the hard disk 262 is played back by a reproducing head.

The head gimbal assembly and the hard disk system here have pretty much the same action as the thin-film magnetic head according to the foregoing embodiment.

While the embodiment here has been described with reference to the thin-film magnetic head of the structure wherein the reproducing head portion is located on the substrate side and the perpendicular recording head portion is stacked on the reproducing head, it is contemplated that that order of stacking could be reversed. When the thin-film magnetic head here is used as a read-only head, the recording head could be removed from it.

SPECIFIC EXPERIMENTS

The magnetoresistive device of the invention is now explained in further details with reference to some specific experiments.

Experimental Example 1

Prepared was an experimental sample for the magnetoresistive device having a configuration shown in FIG. 1 and constructed as set out in Table 1 given below.

That is, as shown in Table 1 given below, the magnetoresistive unit 8 having a multilayer arrangement shown in Table 1 was formed on the first shield layer 3 made substantially of NiFe (with a saturation magnetic flux density Bs of 1 T), and the second shield layer 5 made substantially of NiFe (with a saturation magnetic flux density Bs of 1 T) was formed on that magnetoresistive unit 8.

The first 3 and the second shield layer 5 had the same configuration and size.

Referring typically to the second shield layer 5, it was a window framework obtained by punching a window of substantially quadrangular shape (15 μm×10 μm) out of a rectangular sheet at its center which had a thickness (Z-axis direction size) of 1 μm, a width (X-axis direction size) of 30 μm, and a Y-axis direction size or length that was determined as desired depending on the depth length $Y_1$ of the back frame-constituting portion 55.

The depth length $Y_2$ of the front frame-constituting portion 51 for the second shield layer 5 having the magnetoresistive unit 8 formed in proximity to it was 5 μm ($Y_2$=5 μm). Note here that the width $Y_3$ of the side frame-constituting portion 53 was 7.5 μm.

As shown in FIGS. 1, 2 and 3, the combination of the nonmagnetic gap layer 155 with the bias magnetic field-applying layer 156 was formed on the back frame-constituting portion 55 for the second shield layer 5. Note here that between the nonmagnetic gap layer 155 and the bias magnetic field-applying layer 156, there were a Ta underlay layer (of 3 nm in thickness) and a CrTi buffer layer (of 5 nm in thickness) formed.

The depth length Yb of each of the nonmagnetic gap layer 155 and bias magnetic field-applying layer 156 was the same as the depth length $Y_1$ of the back frame-constituting portion 55; the X-direction width Gp of the nonmagnetic gap layer 155 was 10 μm; and the X-direction width of the bias magnetic field-applying layer 156 was again 10 μm.

The nonmagnetic gap layer 155 was made of alumina.

The bias magnetic field-applying layer 156 was formed by sputtering a hard magnetic material of CoCrPt (with a saturation magnetic flux density Br of 1 T) into a 0.2 μm-thick film.

For the construction of where to correspond to the combination of the nonmagnetic gap layer 155 with the bias magnetic field-applying layer 156, see Table 1-2 given below.

TABLE 1

| Multilayer Structure | | | Layer Material | Thickness (nm) |
|---|---|---|---|---|
| | Second Shield Layer (5) | | NiFe | 1000 |
| Magnetoresistive Unit (8) | Protective Layer (126) | | Ta | 5.0 |
| | | | Ru | 1.0 |
| | Sensor Area | Second Ferromagetnic Layer (150) (Free Layer) | CoFe | 3.0 |

TABLE 1-continued

| Multilayer Structure | | Layer Material | Thickness (nm) |
|---|---|---|---|
| Nonmagnetic Intermediate Layer (140) | | MgO | 1.0 |
| Second Ferromagnetic Layer (130) (Fixed Magnetization Layer) | Inner Layer | CoFe | 3.0 |
| | Nonmagnetic Layer | Ru | 0.8 |
| | Outer Layer | CoFe | 2.5 |
| Antiferromagnetic Layer (122) | | IrMn | 6.0 |
| Underlay Layer (121) | | Ru | 2.0 |
| | | Ta | 1.0 |
| First Shield Layer(3) | | NiFe | 1000 |

TABLE 1-2

| Multilayer Structure of the Combination | Layer Material | Thickness (nm) |
|---|---|---|
| Bias Magnetic Field-Applying Layer (156) | CoCrPt | 200 |
| Buffer Layer | CrTi | 5.0 |
| Underlay Layer | Ta | 3.0 |
| Nonmagnetic Gap Layer (155) | $Al_2O_3$ | 1000 |

It is noted that the device bias-applying layer 160 for the application of a bias to the free layer was formed of CrTi/CoCrPt.

The depth length Yb (the same as the depth length $Y_1$ of the back frame-constituting portion 55) of the bias magnetic field-applying layer 156 was varied between 1 μm and 50 μm to change the value of φb/φf(s) in the second shield layer 5 (the value of φ'b/φ'f(s) in the first shield layer 3) to learn what influences that value had on magnetic field resistance in the longitudinal direction (X-direction).

(How to Make an Estimation of Magnetic Field Resistance in the Longitudinal Direction)

Two hundreds (200) devices for the reproducing head were subjected to bar QST (quasi-static-test) at ±500 Oe to investigate an output $Amp_{before}$.

Then, a stress magnetic field of 500 Oe was applied to 200 devices for the reproducing head in the longitudinal direction.

Thereafter, two hundreds (200) devices for the reproducing head were subjected to bar QST (quasi-static-test) at ±500 Oe to investigate an output $Amp_{after}$.

Output fluctuations were defined as mentioned below, using the values of $Amp_{before}$ and $Amp_{after}$, and devices deviating from the range of ±10% output fluctuations (the range of −10% to +10%) were judged as defectives.

Output Fluctuations($Amp_{after}$−$Amp_{before}$)/$Amp_{before}$× 100(%)

The incidence of defectives was indicated by percent defective (%).

The results are tabulated in Table 2.

TABLE 2

| Sample No. | Yb(=Y1) (μm) | Yb/Y2 | Fb/Ff(s) | Percent Defective (%) |
|---|---|---|---|---|
| Comp. Ex. 1-1* | 1.0 | 0.2 | 0.04 | 43 |
| Comp. Ex. 1-2* | 3.0 | 0.6 | 0.1 | 41 |
| Comp. Ex. 1-3* | 5.0 | 1.0 | 0.2 | 40 |
| Ex. 1-0 | 7.0 | 1.4 | 0.3 | 26 |
| Ex. 1-1 | 10.0 | 2.0 | 0.4 | 25 |
| Ex. 1-2 | 15.0 | 3.0 | 0.6 | 21 |
| Ex. 1-3 | 20.0 | 4.0 | 0.8 | 13 |
| Ex. 1-4 | 25.0 | 5.0 | 1.0 | 10 |
| Ex. 1-5 | 30.0 | 6.0 | 1.2 | 8 |
| Ex. 1-6 | 35.0 | 7.0 | 1.4 | 7 |
| Ex. 1-7 | 40.0 | 8.0 | 1.6 | 9 |
| Ex. 1-8 | 45.0 | 9.0 | 1.8 | 6 |
| Ex. 1-9 | 50.0 | 10.0 | 2.0 | 7 |
| Comp. Ex. 1-4* | 5.0 | — | — | 48 |

Used in Comparative Example 4* was a 1-μm thick rectangular shield generally so far employed in the art and having a rectangular planar shape of 30 μm×15 μm.

From the results tabulated in Table 1, it is found that the devices within the range of the invention of this application are more reduced in the incidence of defectives than the comparative examples that are prior art examples under severe measuring conditions.

Experimental Example 2

In the sample of Example 1-5 in the aforesaid Experimental Example 1, NiFe was used for the nonmagnetic gap layer 155 partially used for the back frame-constituting portion for the first 3 and the second shield layer 5 to prepare a sample of Comparative Example 2-5*. It follows that in the sample of Comparative Example 2-5*, the portion of the nonmagnetic gap layer 155 in FIG. 3 was made of a high-permeable shield material, providing an arrangement wherein the bias magnetic field-applying layer 156 was formed at a part of the uninterrupted window frame of a NiFe material (an arrangement similar to that of FIG. 3 in JP(A)2007-242140).

For this sample of Comparative Example 2-5*, percent defective (%) was found in the same way as mentioned above for comparison with that of the sample of Example 1-5. The results are tabulated in Table 3 given below.

TABLE 3

| Sample No. | Yb(=Y$_1$) (μm) | Yb/Y2 | Fb/Ff(s) | Percent Defective (%) |
|---|---|---|---|---|
| Ex. 1-5 | 30.0 | 6.0 | 1.2 | 8 |
| Comp. Ex. 2-5* | 30.0 | 6.0 | 1.2 (theoretical) | 45 |

Experimental Example 3

In the sample of Example 1-5 in the aforesaid Experimental Example 1, the nonmagnetic gap layer 155 partially used for the back frame-constituting portion for the first 3 and the second shield layer 5 was replaced by the bias magnetic field-applying layer 156 to prepare a sample of Comparative Example 3-5*. It follows that in the sample of Comparative Example 3-5*, the portion of the nonmagnetic gap layer 155 in FIG. 3 becomes the bias magnetic field-applying layer 156 (an arrangement similar to that of FIG. 4 in JP(A)2007-242140).

For this sample of Comparative Example 3-5*, percent defective (%) was found in the same way as mentioned above for comparison with that of the sample of Example 1-5. The results are tabulated in Table 4 given below.

TABLE 4

| Sample No. | Yb(=Y$_1$) (μm) | Yb/Y2 | Fb/Ff(s) | Percent Defective (%) |
|---|---|---|---|---|
| Ex. 1-5 | 30.0 | 6.0 | 1.2 | 8 |
| Comp. Ex. 3-5* | 30.0 | 6.0 | 1.2 (theoretical) | 42 |

From the aforesaid results, the advantages of the invention would be undisputed.

That is, the invention provides a magnetoresistive device of the CPP (current perpendicular to plane) structure, comprising a magnetoresistive unit, and a first, substantially soft magnetic shield layer positioned below and a second, substantially soft magnetic shield layer positioned above, which are located and formed such that the magnetoresistive unit is sandwiched between them from above and below, with a sense current applied in the stacking direction, wherein said magnetoresistive unit comprises a nonmagnetic intermediate layer, and a first ferromagnetic layer and a second ferromagnetic layer stacked and formed such that said nonmagnetic intermediate layer is sandwiched between them; at least one of said first shield layer positioned below and said second shield layer positioned above is configured in a window frame shape having a planar shape (X-Y plane) defined by the width and length directions of the device; said window framework has a front frame-constituting portion located on a medium opposite plane side in front and near where the magnetoresistive unit is positioned, and a back frame-constituting portion located in the rear of said front frame-constituting portion; the depth length of said back front-constituting portion is larger than the depth length of said front frame-constituting portion; said back frame-constituting portion partially comprises a combination of a nonmagnetic gap layer with a bias magnetic field-applying layer; said nonmagnetic gap layer is designed and located such that a magnetic flux given out of said bias magnetic field-applying layer is efficiently sent out to said front frame-constituting portion; and the combination of said nonmagnetic gap layer with said bias magnetic field-applying layer forms a closed magnetic path with a magnetic flux going all the way around said window framework, and turns the magnetization of said front frame-constituting portion into a single domain. It is thus possible to turn the shield layer into a single domain in an easy, stable way, make the stability of a domain structure better, and reduce output fluctuations of the reproducing head under the influences of the shield layers, thereby obtaining stable outputs.

INDUSTRIAL APPLICABILITY

The present invention could be applied to the industry of magnetic disk systems comprising a magnetoresistive device operable to read the magnetic field intensity of magnetic recording media or the like as signals.

What we claim is:

1. A magnetoresistive device of a CPP (current perpendicular to plane) structure, comprising a magnetoresistive unit, and a first, substantially soft magnetic shield layer positioned below and a second, substantially soft magnetic shield layer positioned above, which are located and formed such that the magnetoresistive unit is sandwiched between them from above and below, with a sense current applied in a stacking direction, characterized in that:

said magnetoresistive unit comprises a non-magnetic intermediate layer, and a first ferromagnetic layer and a second ferromagnetic layer stacked and formed such that said nonmagnetic intermediate layer is sandwiched between them, at least one of said first shield layer positioned below and said second shield layer positioned above is configured in a window frame shape having a planar shape (X-Y plane) defined by the width and length directions of the device, said window framework has a front frame-constituting portion located on a medium opposite plane side in front and near where the magnetoresistive unit is positioned, and a back frame-constituting portion located in the rear of said front frame-constituting portion, the depth length of said back front-constituting portion is larger than the depth length of said front frame-constituting portion, said back frame-constituting portion partially comprises a combination of a nonmagnetic gap layer with a bias magnetic field-applying layer, said nonmagnetic gap layer is designed and located such that a magnetic flux given out of said bias magnetic field-applying layer is efficiently sent out to said front frame-constituting portion, and the combination of said nonmagnetic gap layer with said bias magnetic field-applying layer forms a closed magnetic path with a magnetic flux going all the way around said window framework, and turns the magnetization of said front frame-constituting portion into a single domain.

2. The magnetoresistive device according to claim 1, wherein φb/φf(s) is set to the range of 0.3 to 2.0 where φb is the total quantity of a magnetic flux flowing out of said bias magnetic field-applying layer and φf(s) is the saturation quantity of a magnetic flux for saturation of magnetization of the front frame-constituting portion where said magnetoresistive unit is positioned.

3. The magnetoresistive device according to claim 1, wherein the depth length of said back frame-constituting portion is 1.4 to 10 times as large as the depth length of said front frame-constituting portion.

4. The magnetoresistive device according to claim 1, wherein said nonmagnetic gap layer is buried in said back frame-constituting portion, and the bias magnetic field-applying layer is formed adjacent to said nonmagnetic gap layer.

5. The magnetoresistive device according to claim 1, wherein:
- said second shield layer that is positioned above is configured in a window framework having a planar shape (X-Y plane) defined by the width and length directions of the device,
- said window framework comprises a front frame-constituting portion located on a medium opposite plane side in front and near where the magnetoresistive unit is positioned, and a back frame-constituting portion located in the rear of that front frame-constituting portion,
- the depth length $Y_1$ of said back frame-constituting portion is larger than the depth length $Y_2$ of said front frame-constituting portion ($Y_1 > Y_2$),
- said back frame-constituting portion partially comprises a combination of a nonmagnetic gap layer with a bias magnetic field-applying layer,
- said nonmagnetic gap layer is designed and located such that a magnetic flux given out of said bias magnetic field-applying layer is efficiently sent out to said front frame-constituting portion,
- the combination of said nonmagnetic gap layer with said bias magnetic field-applying layer forms a closed magnetic path with a magnetic flux going all the way around said window frame shape forming said first shield layer, and turns the magnetization of said front frame-constituting portion into a single domain,
- said first shield layer that is positioned below is configured in a window framework having a planar shape (X-Y plane) defined by the width and length directions of the device,
- said window framework comprises a front frame-constituting portion located on a medium opposite plane side in front and near where the magnetoresistive unit is positioned, and a back frame-constituting portion located in the rear of that front frame-constituting portion,
- the depth length $Y_{11}$ of said back frame-constituting portion is larger than the depth length $Y_{22}$ of said front frame-constituting portion ($Y_{11} > Y_{22}$),
- said back frame-constituting portion partially comprises a combination of a nonmagnetic gap layer with a bias magnetic field-applying layer,
- said nonmagnetic gap layer is designed and located such that a magnetic flux given out of said bias magnetic field-applying layer is efficiently sent out to said front frame-constituting portion,
- the combination of said nonmagnetic gap layer with said bias magnetic field-applying layer forms a closed magnetic path with a magnetic flux going all the way around said window frame shape forming said first shield layer, and turns the magnetization of said front frame-constituting portion into a single domain.

6. The magnetoresistive device according to claim 5, wherein in said second shield layer, the depth length $Y_1$ of said back frame-constituting portion is 1.4 to 10 times as large as the depth length $Y_2$ of said front frame-constituting portion, and in said first shield layer, the depth length $Y_{11}$ of said back frame-constituting portion is 1.4 to 10 times as large as the depth length $Y_{22}$ of said front frame-constituting portion.

7. The magnetoresistive device according to claim 5, wherein in said first and second shield layers, said nonmagnetic gap layers are each buried in said back frame-constituting portion, and the bias magnetic field-applying layer is formed adjacent to said nonmagnetic gap layer.

8. The magnetoresistive device according to claim 1, wherein each of said first and second shield layers has a thickness of 0.5 to 2.0 μm, and the bias magnetic field-applying layer has a thickness of 0.1 to 0.3 μm.

9. The magnetoresistive device according to claim 1, wherein both ends of said magnetoresistive unit in the width direction (X-direction) are provided with a device bias-applying layer for applying a bias magnetic field to the first and second ferromagnetic layers functioning as free layers.

10. The magnetoresistive device according to claim 9, wherein said bias magnetic field-applying layers and device bias-applying layer are magnetized integrally and simultaneously in the width direction (X-direction).

11. A thin-film magnetic head, characterized by comprising:
- a plane in opposition to a recording medium, and
- a magnetoresistive device as recited in claim 1, which is located near said medium opposite plane to detect a signal magnetic field from said recording medium.

12. A head gimbal assembly, characterized by comprising:
- a slider including a thin-film magnetic head as recited in claim 11 and located in such a way as to oppose to a recording medium, and
- a suspension adapted to resiliently support said slider.

13. A magnetic disk system, characterized by comprising:
- a slider including a thin-film magnetic head as recited in claim 11 and located in such a way as to oppose to a recording medium, and
- a positioning device adapted to support and position said slider with respect to said recording medium.

* * * * *